United States Patent
Fortuna et al.

(10) Patent No.: US 6,546,464 B2
(45) Date of Patent: *Apr. 8, 2003

(54) METHOD AND APPARATUS FOR INCREASING DATA RATES IN A DATA NETWORK WHILE MAINTAINING SYSTEM COHERENCY

(75) Inventors: Michael W. Fortuna, Fremont, NH (US); Peter B. Beaulieu, Plaistow, NH (US); Bruce D. Miller, North Reading, MA (US); Roland T. Provencher, Hudson, NH (US); Larnie S. Rabinowitz, Lexington, MA (US); Douglass E. Walker, Boston, MA (US)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/228,003

(22) Filed: Jan. 8, 1999

(65) Prior Publication Data

US 2002/0065991 A1 May 30, 2002

(51) Int. Cl.⁷ .............................................. G06F 12/00
(52) U.S. Cl. ...................... 711/141; 711/124; 711/146
(58) Field of Search ................................. 711/118, 124, 711/130, 141, 146, 154

(56) References Cited

U.S. PATENT DOCUMENTS

| | | | |
|---|---|---|---|
| 5,263,142 A | * 11/1993 | Watkins et al. | 710/22 |
| 5,313,609 A | * 5/1994 | Baylor et al. | 711/121 |
| 5,675,807 A | * 10/1997 | Iswandhi et al. | 710/260 |
| 5,907,853 A | * 5/1999 | Jacobs et al. | 711/3 |
| 5,914,953 A | * 6/1999 | Krause et al. | 370/392 |
| 5,987,571 A | * 11/1999 | Shibata et al. | 711/141 |
| 6,073,216 A | * 6/2000 | McDonald et al. | 711/141 |
| 6,094,710 A | * 7/2000 | Arimilli et al. | 711/153 |

* cited by examiner

Primary Examiner—Tuan V. Thai
(74) Attorney, Agent, or Firm—Blakely, Sokoloff, Taylor & Zafman LLP

(57) ABSTRACT

An apparatus comprising system memory and a cache memory maintain system coherency for data stored in a subset of memory elements utilizing software coherency control, while system coherency for all remaining memory elements is maintained utilizing hardware coherency control.

17 Claims, 10 Drawing Sheets

| Tag Entries | Address 201 | Cache Line 206 | Data 208 |
|---|---|---|---|
| 0.1 | 000-01f | 0 | DMA Descriptors |
| 0.0 | 020-03f | 1 | No Access |
| 0.1 | 040-05f | 2 | Buffer 1 : GLL |
| 0.1 | 060-07f | 3 | Buffer 1 : Frame Data 00-1f |
| 0.1 | 080-09f | 4 | Buffer 1 : Frame Data 20-3f |
| 1.1 | 0a0-0bf | 5 | Buffer 1 : Frame Data 40-5f |
| 1.1 | 0c0-0df | 6 | Buffer 1 : Frame Data 60-7f |
| 1.1 | 0e0-0ff | 7 | Buffer 1 : Frame Data 80-9f |
| 1.1 | 100-11f | 9 | Buffer 1 : Frame Data a0-bf |
| 1.1 | 120-13f | a | Buffer 1 : Frame Data c0-df |
| 1.1 | 140-15f | b | Buffer 1 : Frame Data e0-ff |
| 0.0 | 160-17f | c | No Access |
| 0.1 | 180-19f | d | Buffer 2 : GLL |
| 0.1 | 1a0-1bf | e | Buffer 2 : Frame Data 00-1f |
| 0.1 | 1c0-1df | f | Buffer 2 : Frame Data 20-3f |
| 1.1 | 1e0-1ff | 10 | Buffer 2 : Frame Data 40-5f |
| 1.1 | 200-21f | 11 | Buffer 2 : Frame Data 60-7f |
| 1.1 | 220-23f | 12 | Buffer 2 : Frame Data 80-9f |
| 1.1 | 240-25f | 13 | Buffer 2 : Frame Data a0-bf |
| 1.1 | 260-27f | 14 | Buffer 2 : Frame Data c0-df |
| 1.1 | 280-29f | 15 | Buffer 2 : Frame Data e0-ff |

*Figure 2A*

| Address | Cache Line | Data |
|---|---|---|
| 000-01f | 0 | DMA Descriptors |
| 020-03f | 1 | No Access |
| 040-15f | 2 | Buffer 1 : GLL |
| 160-17f | c | No Access |
| 180-19f | d | Buffer 2 : GLL |
| 1a0-1bf | e | Buffer 2 : Frame Data 00-1f |
| 1c0-1df | f | Buffer 2 : Frame Data 20-3f |
| 1e0-1ff | 10 | Buffer 2 : Frame Data 40-5f |
| 200-21f | 11 | Buffer 2 : Frame Data 60-7f |
| 220-23f | 12 | Buffer 2 : Frame Data 80-9f |
| 240-25f | 13 | Buffer 2 : Frame Data a0-bf |
| 260-27f | 14 | Buffer 2 : Frame Data c0-df |
| 280-29f | 15 | Buffer 2 : Frame Data e0-ff |

| Tag Entries |
|---|
| 0.1 |
| 0.0 |
| 0.1 |
| 0.0 |
| 0.1 |
| 0.1 |
| 0.1 |
| 1.0 |
| 1.0 |
| 1.0 |
| 1.0 |
| 1.0 |
| 1.0 |

*Figure 2B*

| Address | Cache Line | Data |
|---|---|---|
| 000-01f | 0 | DMA Descriptors |
| 020-03f | 1 | No Access |
| 040-15f | 2 | Buffer 1 : GLL |
| 160-17f | c | No Access |
| 180-19f | d | Buffer 2 : GLL |
| 1a0-1bf | e | Buffer 2 : Frame Data 00-1f |
| 1c0-1df | f | Buffer 2 : Frame Data 20-3f |
| 1e0-1ff | 10 | Buffer 2 : Frame Data 40-5f |
| 200-21f | 11 | Buffer 2 : Frame Data 60-7f |
| 220-23f | 12 | Buffer 2 : Frame Data 80-9f |
| 240-25f | 13 | Buffer 2 : Frame Data a0-bf |
| 260-27f | 14 | Buffer 2 : Frame Data c0-df |
| 280-29f | 15 | Buffer 2 : Frame Data e0-ff |

200

| Tag Entries |
|---|
| 0.1 |
| 0.0 |
| 0.1 |
| 0.0 |
| 0.1 |
| 0.1 |
| 0.1 |
| 1.1 |
| 1.1 |
| 1.0 |
| 1.0 |
| 1.0 |
| 1.0 |

| 430 | REQ_OUT [1:0] | HH | HH | LH | LL | LL | HH | HH | | |
|---|---|---|---|---|---|---|---|---|---|---|
| 431 | REQ_IN [1:0] | HH | HH | HH | LH | LL | LL | HH | | |
| 434 | DMA_BURST | H | H | H | H | L | L | L | L | H |
| 436 | DMA_BLAST | H | H | H | H | H | H | H | L | H |
| 435 | DMA_PORT | X | X | X | X | 0 | 2 | 1 | 3 | X |
| 432 | DMA_DATA | X | X | X | X | X | Ch0 | Ch2 | Ch1 | Ch3 |

| 430 | REQ_OUT [1:0] | HH | HH | LL | LL | LL | HH | HH | | |
|---|---|---|---|---|---|---|---|---|---|---|
| 431 | REQ_IN [1:0] | HH | HH | HH | LL | LL | LL | HH | | |
| 434 | DMA_BURST | H | H | H | H | L | L | L | L | H |
| 436 | DMA_BLAST | H | H | H | H | H | H | H | L | H |
| 435 | DMA_PORT | X | X | X | X | 0 | 2 | 1 | 3 | X |
| 432 | DMA_DATA | X | X | X | X | X | Ch0 | Ch2 | Ch1 | Ch3 |

| 430 | REQ_OUT [0] | H | H | L | L | L | L | H | | |
|---|---|---|---|---|---|---|---|---|---|---|
| 431 | REQ_IN [0] | H | L | L | L | L | H | H | H | |
| 434 | DMA_BURST | H | H | H | H | L | L | L | L | H |
| 436 | DMA_BLAST | H | H | H | H | H | H | H | L | H |
| 432 | DMA_DATA | X | X | X | X | X | Ch0 | Ch0 | Ch0 | Ch0 |
|   |   | 702 | 704 | 706 | 708 | 710 | 712 | 714 | 716 | 718 |

Figure 8

| 430 | REQ_OUT [1:0] | HH | HH | LL | LL | LL | HH | HH | | | |
|---|---|---|---|---|---|---|---|---|---|---|---|
| 431 | REQ_IN [1:0] | HH | HH | HH | LL | LL | LL | HH | | | |
| 437 | DMA_FLCTL | H | H | H | H | L | H | H | | | |
| 434 | DMA_BURST | H | H | H | H | L | L | H | L | L | H |
| 436 | DMA_BLAST | H | H | H | H | H | H | H | H | L | H |
| 435 | DMA_PORT | X | X | X | X | 0 | 2 | X | 1 | 3 | X |
| 432 | DMA_DATA | X | X | X | X | X | Ch0 | Ch2 | X | Ch1 | Ch3 |
|   |   | 802 | 804 | 806 | 808 | 810 | 812 | 814 | 816 | 818 | 820 |

METHOD AND APPARATUS FOR INCREASING DATA RATES IN A DATA NETWORK WHILE MAINTAINING SYSTEM COHERENCY

The present invention is related to U.S. application Ser. No. 09/227,384, now abandoned; entitled A Bandwidth Optimized Input/Output Bus and Protocol filed contemporaneously herewith by the inventors of the present application and commonly assigned to the assignee of the present application, the content of which is expressly incorporated herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise expressly reserves all rights whatsoever in said copyright works.

BACKGROUND OF THE INVENTION

1. Field of the Invention

The present invention relates to the field of data networking and, in particular, to a method and apparatus for increasing data rates in a data network while maintaining system coherency.

2. Background Information

As computer technology has evolved, so too has the use of data networks to communicatively couple computer systems together enabling them to communicate with one another. Data networks come in many different sizes and network topologies. From small peer-to-peer networks enabling multiple users of a small office to share data, to more formal local area networks (LAN), wide-area and global data networks (i.e., the Internet). As reliance on such computer networks has increased, so too has the data traffic and congestion experienced on such networks.

Those skilled in the art will appreciate that a lot of congestion occurs within the network devices used as network routing or switching points within the network core, e.g., routers, switches, bridges and the like. One reason for such congestion is the processing associated with the routing or switching decisions which are made, typically, on a frame by frame basis. That is, data packets are received and stored in a packet buffer(s) (e.g., system memory), analyzed and forwarded based on routing information contained within the packet, e.g., destination node address, as well as other network routing criteria, e.g., load balancing considerations. Another reason for the congestion is that many prior art input/output (I/O) busses are not optimized for network switching applications. As network traffic has increased, so too has the pressure to alleviate the bottlenecks associated with "core congestion", i.e., the congestion caused by devices in the network core.

A necessary first step in alleviating the core congestion was to increase the number and processing capability of processors in core devices, thereby creating a multiprocessor environment in the network core devices. However, those skilled in the art will appreciate that having multiple processors access common memory space dramatically increases the complexity of the data management required, often referred to as system coherency. That is, when multiple processors have access to common memory space, steps must be taken to ensure that the data retrieved from a memory space is still valid data. Accordingly, prior art network devices relied on either hardware or software approaches to maintaining system coherency for data stored within the common data packet buffers. Although the move to multiprocessing system with either hardware or software methods for maintaining system coherency incrementally improved the congestion experienced at network nodes, such improvement was short-lived. That is, traffic over data networks is constantly increasing thus requiring new and improved network devices to manage such data and alleviate congestion bottlenecks.

Thus, a method and apparatus for increasing data rates while maintaining system coherency is required, unencumbered by the deficiencies and inherent limitations commonly associated with the network devices of the prior art. It will be apparent to those skilled in the art, from the description to follow, that the present invention achieves these and other desired results.

SUMMARY OF THE INVENTION

In accordance with the teachings of the present invention, a method and apparatus for increasing data rates in a data network while maintaining system coherency is provided. In particular, in accordance with one embodiment of the present invention, an apparatus comprising system memory and a cache memory maintain system coherency for data stored in a subset of memory elements utilizing software coherency control, while system coherency for all remaining memory elements is maintained utilizing hardware coherency control.

BRIEF DESCRIPTION OF DRAWINGS

The present invention will be described by way of exemplary embodiments, but not limitations, illustrated in the accompanying drawings in which like references denote similar elements, and in which:

FIG. 2, including FIGS. 2A, 2B and 2C, illustrates a block diagram of an example cache memory denoting cache lines and a tag buffer suitable for use in accordance with the teachings of the present invention;

FIGS. 6A and 6B graphically illustrate example signal diagrams for DMA transmit and receive operations, respectively, while operating in a multi-channel mode of operation, in accordance with one embodiment of the present invention;

FIG. 7 graphically illustrates an example signal diagram for bus control while operating in a single channel mode of operation, in accordance with one embodiment of the present invention;

FIG. 8 graphically illustrates an example signal diagram associated with the flow control provisions of the present invention, in accordance with one embodiment of the present invention.

DETAILED DESCRIPTION OF THE INVENTION

In the following description, various aspects of the present invention will be described. However, it will be apparent to those skilled in the art that the present invention may be practiced with only some or all aspects of the present invention. For purposes of explanation, specific numbers and configurations are set forth in order to provide a thorough understanding of the present invention. However, it will also be apparent to those skilled in the art that the present invention may be practiced without these specific details. In other instances, well known features are omitted or simplified for clarity.

Reference in the specification to "one embodiment" or "an embodiment" means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexers, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

As used herein, use of the term cache line (or cache block) is intended to represent a particular memory size only, and does not reference an actual block of memory space within the cache itself. That is, a cache line should be thought of simply as the basic unit of coherency, irregardless of the memory space referenced. In one embodiment, a cache line is 32 bytes long, while in alternate embodiments a cache line is 64 bytes, 128 bytes, 256 bytes, or any multiple thereof, long. Thus, reference will be made to cache lines within system memory 108 which simply references blocks of memory within system memory 108 which are a cache line long.

Figure 1:
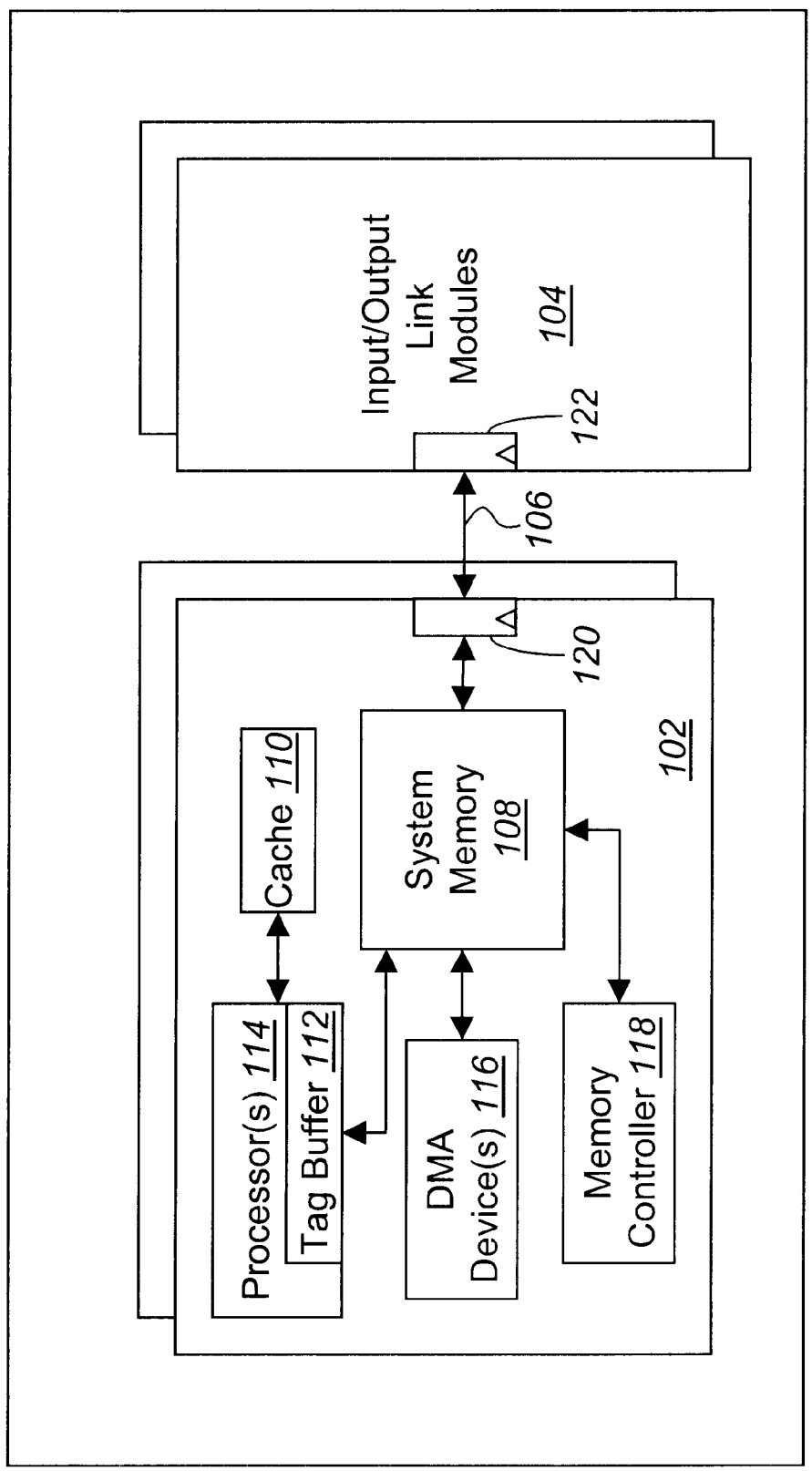
FIG. 1 illustrates a block diagram of a network device incorporating the teachings of the present invention in accordance with one embodiment of the present invention.

Turning to FIG. 1, a block diagram of an example network device incorporating the teachings of the present invention is provided. In accordance with the illustrated example embodiment of FIG. 1, network device 100 is shown comprising one or more processor modules 102, one or more input/output (I/O) link modules 104 and an I/O bus 106, communicatively coupled as shown. In accordance with one aspect of the present invention, to be discussed more fully below, processor modules 102 selectively cache frames at processor(s) 114 (or associated cache 110), based on the type of frame, and maintain system coherency utilizing an innovative protocol that relies on software coherency for certain elements of the memory space, while relying on hardware coherency for other elements of the memory space. More specifically, processor modules 102 incorporating the teachings of the present invention utilize software coherency control to maintain the coherency of the so-called "well known cache lines" of a frame, which must be accessed by a processor when processing a frame, and utilize hardware coherency control to maintain the coherency of all remaining cache lines, which a processor may or may not need to access to appropriately process the frame. Thus, those skilled in the art will appreciate, from the description to follow, that the innovative approach to system coherency herein described enables processor module 102 to (a) maintain system coherency with a minimum number of time consuming cache block invalidate (e.g., kill) operations, and (b) perform the majority of kill operations under software coherency control, which requires less core bus cycles than do the bus kill operations associated with hardware coherency control.

In accordance with another aspect of the present invention, to be discussed more fully below, network device 102 also includes an innovative bandwidth optimized input/output (I/O) bus 106 and associated protocol facilitating a high performance memory system with low latency. Those skilled in the art will appreciate, from the description to follow, that the teachings of the present invention represents a new paradigm in core network device technology, enabling network devices to route data packets at a much faster rate alleviating the congestion often associated with prior art network devices.

With continued reference to FIG. 1, I/O module(s) 104 interface network device 100 to network A and network B. Although I/O module(s) 104 is depicted comprising only register 122, those skilled in the art will appreciate that I/O module 104 may well contain other elements such as, for example, buffers, DMA devices, bus controller(s), programmable logic arrays (PLA's), processor(s) and the like. In accordance with the illustrated example embodiment, register 122 is used to stage packets to be transferred to another module within network device 100, e.g., processor module(s) 102. In accordance with one aspect of the present invention, to be discussed more fully below, I/O module(s) 104 communicate with other network device modules through an innovative bandwidth optimized I/O bus 106 which improves the data transfer rate between and among network device modules, e.g., processor module(s) 102.

With continued reference to FIG. 1, processor module 102 is shown comprising an input/output register 120, system memory 108, direct memory access (DMA) device(s) 116, memory controller 118, processor(s) 114 with associated cache(s) 110 and tag buffer 112, each communicatively coupled as depicted. As used herein, system memory 108, DMA devices 116 and memory controller 118 are intended to represent any of a number of commonly available memory types, DMA devices and memory controllers, respectively, known in the art. In one embodiment, for example, system memory 108 is comprised of static random access memory (SRAM), dynamic random access memory (DRAM), or combinations thereof. In an alternate embodiment, system memory 108 is comprised of magnetic media such as, for example, a hard disk drive, a tape drive, a rewritable compact disk (CD), a digital versatile disk (DVD) and the like. Memory controller 118 is employed to control access to system memory 108 by, in particular, remote devices. In certain embodiments, memory controller 118 monitors the state of data stored within system memory 108. DMA devices 116 utilize direct "channels" to access data in system memory 108, without having to go through processor(s) 114 or memory controller 118. Those skilled in the art will appreciate that system memory technology, memory controllers and DMA devices are each relatively well known and, as such, they need not be further described here.

As used herein, each of processor(s) 114 are intended to represent a broad range of processing devices including, but not limited to, a microcontroller, a microprocessor, an application specific integrated circuit (ASIC), a programmable logic array (PLA), and the like. In one embodiment, processor(s) 114 are superscalar processors. Further, although depicted as separate devices, processor 114 with tag buffer 112 may well include cache 110 within the processor package. In one embodiment, processor(s) 114 may well have cache within and outside of the processor package. In one embodiment, tag buffer 112 may well reside outside of the processor package. Those skilled in the art will appreciate, from the description to follow, that such modifications do not deviate from the spirit or scope of the present invention and are, thus, anticipated by the teachings of the present invention.

In accordance with one aspect of the present invention, processor module(s) 102 utilize a processor cache, e.g., cache 110 to selectively cache frames based, in part, on the type of frame. That is, only those cache lines of frames which must be interpreted by processor 114 to appropriately route or process the frame are accessed by processor 114 and, thus, cached. All remaining frames are routed from system memory. Accordingly, those skilled in the art will appreciate that the innovative system coherency model, described herein, optimally manages the data in system memory 108 and cache memory 110, only caching those frames which must be interpreted by processor(s) 114, and forwarding the remaining frames after analyzing only the well known cache lines within the frame.

To maintain the system coherency in a processor based forwarding environment, packet data is tagged in system memory 108 at cache line granularities. For ease of explanation, and not limitation, the teachings of the present invention will be presented with reference to a separate tag buffer 112 which maintains the tag entries for the system memory 108. Those skilled in the art will appreciate, however, that in alternate embodiments, the tag entries may be maintained as within the cache line entry itself say, for example, as a certain number of least significant bits of the entry. The tag associated with the cache line defines the coherency protocol that has been defined for that cache line and, as will be described below, depends on the nature of the content of the cache line.

As introduced above, in accordance with one aspect of the present invention, system coherency is maintained through an innovative hardware/software approach, wherein the method of coherency control is defined on a per cache line basis based, at least in part, on the type and/or content of the cache line. As will be described more fully below, software coherency control is employed for the so-called "well known cache lines", while hardware coherency control is utilized for all remaining cache lines. The well known cache lines are those cache lines which contain information denoting the type and destination of the frame, e.g., link list information associated with the operating system (GLL), Internet Protocol (IP) addresses, DMA descriptors, and the like. Thus, when a cache line is accessed within system memory 108 by processor(s) 114, a tag in tag buffer 112 associated with the cache line will be modified to indicate that the data has been placed in cache 110. When the cache line is subsequently written, an invalidate operation is issued to the processor's cache controller (not shown) to denote that the cache line in cache 110 is invalid (unreliable data), which forces subsequent processor accesses to the cache line to retrieve a "new" copy from system memory 108.

Having briefly introduced the innovative memory system and system coherency protocol above, reference is now made to Table 1, wherein the coherency encodings will be developed in further detail. It should be noted, however, that the protocol described with reference to Table 1 is but an example, and protocols of greater or lesser complexity may be substituted without deviating from the spirit or scope of the present invention. Accordingly, system coherency protocols which utilize a combination of software and hardware to maintain system coherency are anticipated within the teachings of the present invention.

TABLE 1

Example Tag Store Encodings

| Coherency Encoding (Tag Entry) | Hardware Manipulation | Meaning |
| --- | --- | --- |
| 0,0 | No | No Access - Signal an error upon access; Typically used to insert a "spacer" between buffers, preventing overrun from the end of one buffer to the beginning of another buffer. |
| 1,1 | No | Software Coherency - Processor is responsible for maintaining coherency by never accessing the cache line or by issuing an invalidate instruction before accessing the cache line. |
| 1,0 | Yes | Hardware Coherency - Generate a bus kill operation if a DMA engine writes this cache line. Once accessed, change the encoding to a 1,1 as soon as the kill operation is posted. |
| 1,1 | Yes | Hardware Coherency - Hardware (bus) is responsible for maintaining coherency to this cache line; change encoding to a (1,0) if the processor reads this cache line. |

Turning to the example protocol illustrated in Table 1, a two bit coherency encoding protocol is depicted. In accordance with the illustrated example embodiment, a tag entry (coherency encoding) of 0,0 denotes No Access. In one embodiment, if an agent or entity attempts to access a cache line with this coherency encoding, an error will be signaled. Accordingly, a coherency encoding of 0,0 is typically used within the context of the present invention as a spacer between buffers, thereby preventing overrun from the end of one buffer to the beginning of another buffer.

A coherency encoding of 0,1 in a tag entry denotes that the cache line assocaited with the tag entry is subject to software coherency control. That is, the processor, e.g., processor(s) 114, is responsible for maintaining coherency of cache lines with an associated tag entry of 0,1 by never accessing the cache line, or by issuing an invalidate instruction (also referred to as a kill operation) before accessing the cache line. The nomenclature of such an invalidate instruction necessarily varies from one processor architecture to another. In one embodiment, for example, processor(s) 114 issue a data cache block invalidate (dcbi) instruction which invalidates the appropriate cache line upon access by the processor. On a per operation basis, software kill operations take less clock cycles than hardware kill operations. In accordance with the teachings of the present invention, only the well known cache lines are subject to software coherency control.

With continued reference to the coherency protocol depicted in Table 1, a coherency encoding of 1,0 denotes that the coherency of the associated cache line is maintained by hardware. Once a cache line with a 1,0 coherency encoding is written by a DMA device, a cache block invalidate (e.g., a bus kill operation) is generated by the memory controller. Once the cache line has been written, the coherency encoding associated with the cache line is changed to a 1,1 as soon as the bus kill operation is posted. A coherency encoding of 1,1 denotes that hardware is responsible for maintaining the coherency associated with this cache line. Once the cache line is read by the processor, the coherency encoding of the associated cache line is changed from a 1,1 to a 1,0.

The relationship between the tag buffer and system memory will be developed further with reference to FIG. 2A, which depicts an example memory space 200 and associated tag buffer 202. In one embodiment, memory space 200 represents system memory 108. In an alternate embodiment, memory space 200 represents cache memory 110. Similarly, in one embodiment, tag buffer 202 represents tag buffer 112 of processor module 102.

As alluded to above, the basic unit of coherency in memory space 200 is a cache line (cache block), thus memory space 200 is shown partitioned on a cache line basis. For ease of explanation, and not limitation, memory space 200 is shown comprising three columns, one each for a memory address 204, cache line number 206 and the data 208. In practice, however, a cache line would merely contain a memory address space 204 and data space 208.

In accordance with one embodiment, tag buffer 202 comprises a number of 2 bit registers 212, 216, etc., each associated with a particular cache line, e.g., 210, 214, etc., respectively. As described above, each tag buffer register is populated with the coherency encoding associated with each cache line of memory space 200 based, at least in part, on the content of the cache line. For example, cache line 0 210 contains DMA descriptors. Thus, in accordance with the teachings provided in Table 1, above, a coherency encoding of 0,1 is entered within tag buffer register 212. Cache line 1 214 is used to separate buffers and, thus, has a coherency encoding of 0,0 in tag buffer register 216 associated with cache line 214.

As shown in FIG. 2A, cache lines 218 denote the start of a buffer entry, "Buffer 1". The first cache line of Buffer 1 contains information associated with the link list employed by the operating system (GLL). The next two cache lines (64 bytes) contain media access control (MAC) and IP header information. As introduced above, the first three cache lines 218 of Buffer 1 are the well known cache lines and are, in accordance with the innovative system coherency protocol of the present invention, subject to software coherency control. Accordingly, tag buffer registers 220 associated with the three well known cache lines 218 are denoted with coherency encodings of 0,1. Following the three well known cache lines 218 are a number of cache lines containing frame data which, depending on the content of the three well known cache lines, may or may not be accessed by processor 114 and, are therefore, subject to hardware coherency control. As shown, a single cache line with associated coherency encoding of 0,0 is used to separate Buffer 1 from Buffer 2, with associated coherency encodings reflecting the nature of the content of the corresponding cache lines.

Figure 3:
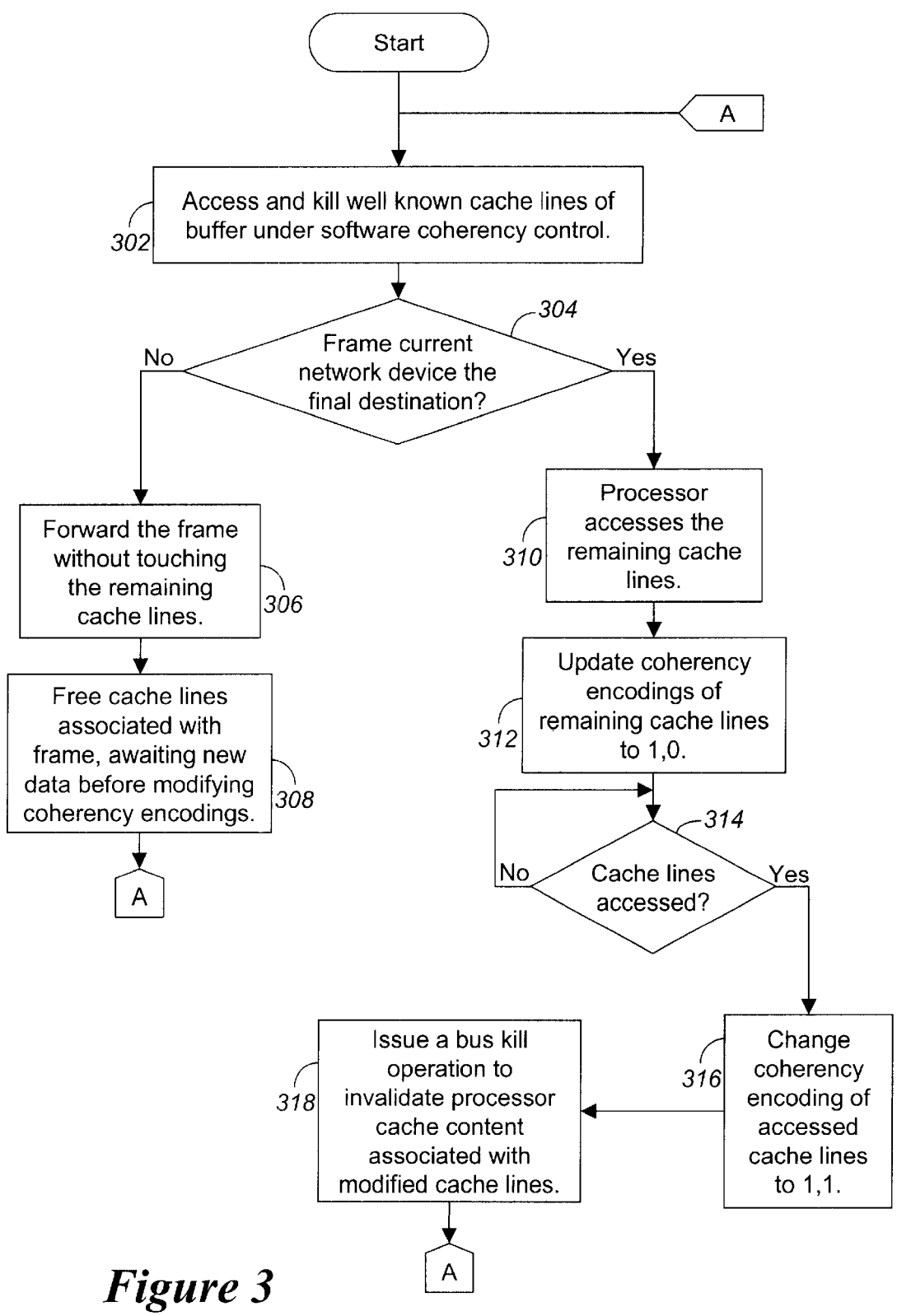
FIG. 3 illustrates a flow chart of an example method for maintaining system coherency of packet data, in accordance with one embodiment of the present invention.

As introduced above, with reference to Table 1, the coherency encodings of tag buffer 202 are dynamically changed to reflect the current state of the cache line. To illustrate the state transitions necessary to maintain system coherence according to the teachings of the present invention, reference is made to FIG. 3. As shown, FIG. 3 illustrates a flow chart of an example method for maintaining system coherency for a network device employing processor based forwarding of network data. For ease of explanation, and not limitation, the teachings of this aspect of the present invention will be developed in the context of an example application with reference to Buffer 2 presented in FIGS. 2A through 2C.

Turning to FIG. 3, the method begins at 302 wherein processor(s) 114 access the well known cache lines (i.e., cache lines d, e and f) of Buffer 2. In accordance with the teachings of the present invention, the well known cache lines are subject to software coherency control of the processor and, as a result have a coherency encoding of 0,1 in their respective tag registers. Thus, as processor 114 accesses each of the well known cache lines, processor 114 issues a kill instruction (e.g., the dcbi instruction) and then reads the content of the cache line. Once processor 114 has accessed and invalidated the three well known cache lines, a determination is made as to whether processor 114 need access the remaining cache lines of the frame in order to appropriately process the frame, block 304. As provided above, processor 114 makes the determination of whether the remaining cache lines of the frame must be accessed based on the nature of the frame, i.e., whether the frame must be interpreted by, or merely forwarded by network device 102.

If, in block 304 processor 114 determines from the well known cache lines that the frame is intended for another network device, the frame is forwarded without touching the remaining cache lines of the buffer, block 306. That is, processor 114 identifies the type and intended destination node from the well known cache lines and need not access the remaining cache lines. Since the remaining cache lines are subject to hardware coherency control, and were not accessed by processor 114 the coherency encodings associated with these cache lines remain unchanged until Buffer 2 is freed and new data is written to the cache lines of Buffer 2, block 308.

Alternatively, if in block 304 it is determined that the accessed frame is a control frame and, therefore, intended for network device 102, processor 114 accesses the remaining cache lines of Buffer 2, block 310. Once processor 114 accesses the remaining cache lines of Buffer 2, it is assumed that these cache lines are now stored in processor cache 110. Accordingly, the coherency encoding for these cache lines are updated to reflect that the contents of the cache lines are also stored in cache memory 110, block 312, as the cache lines associated with Buffer 2 are freed. In accordance with the protocol presented above in Table 1, the coherency encodings for these cache lines are updated to reflect shared hardware coherency control 1,0, as reflected in FIG. 2B. That is, the coherency encoding of tag registers 228 associated with the remaining cache lines 226 of Buffer 2 are modified from the 1,1 depicted in FIG. 2A to 1,0 as depicted in FIG. 2B. The coherency encoding associated with remaining cache lines 226 of Buffer 2 remaining until, in block 314, the remaining cache lines are accessed.

If, in block 314 the remaining cache lines 226 of Buffer 2 are written to, the coherency encoding in tag registers 228 associated with the remaining cache lines are updated to reflect hardware coherency control, block 316. FIG. 2C provides an example wherein Buffer 2 receives 128 bytes of data, thus extending into the first two cache lines 230 of the remaining cache lines of Buffer 2. Accordingly, tag registers 232 associated with these modified cache lines 230 of Buffer 2 are updated to reflect hardware coherency control 1,1. In addition to updating the tag registers associated with the modified cache lines, a bus kill instruction is issued by the FSM of the memory controller to processor 114, which accepts the instruction during a snoop phase and the lines within cache 110 associated with the modified cache lines 230 in system memory 200 are changed from an exclusive status (e.g., data valid) to an invalid status, block 318.

Figure 4:
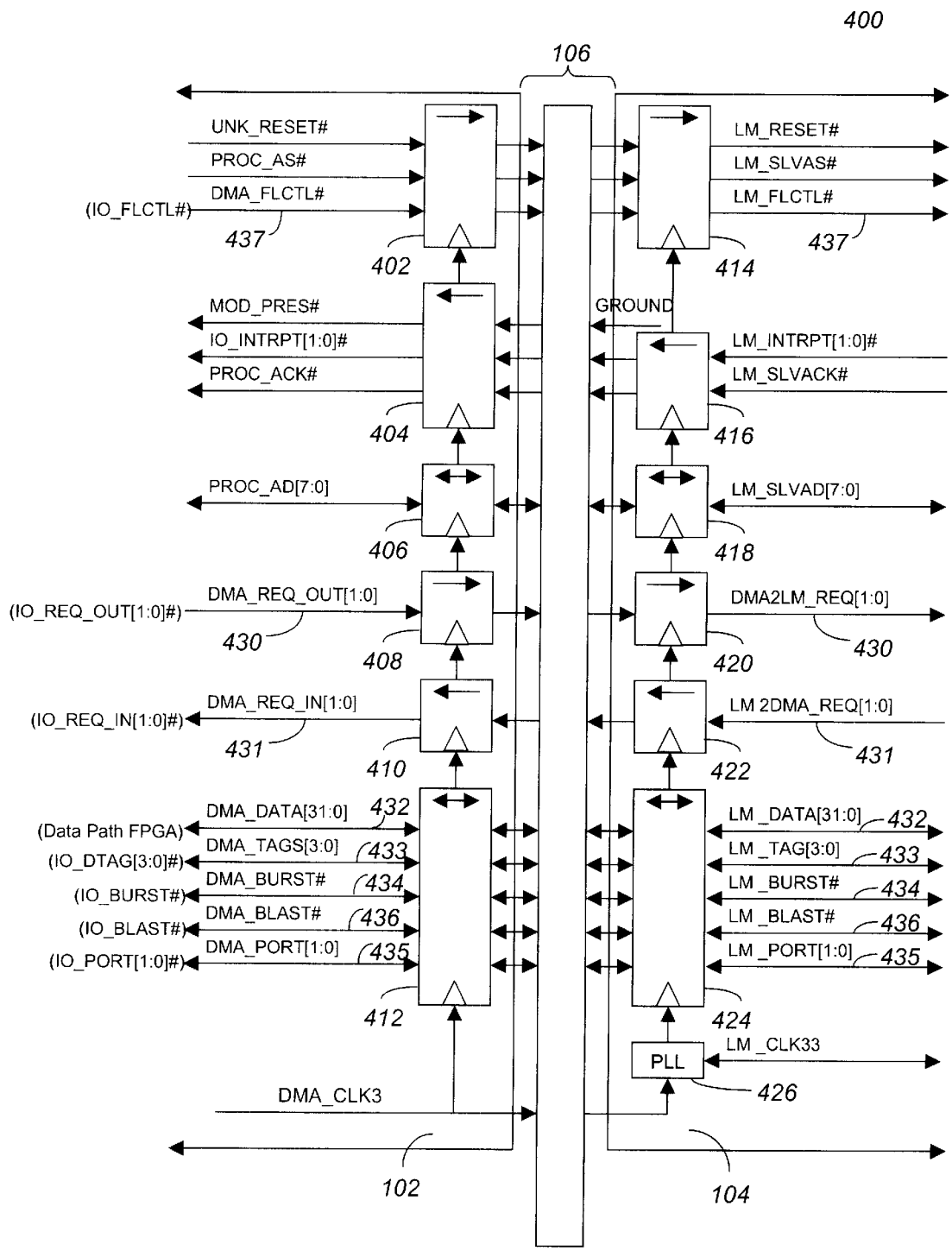
FIG. 4 illustrates a block diagram of an example input/output bus interface incorporating the teachings of the present invention, in accordance with one embodiment of the present invention.

Having described the innovative memory system and associated system coherency protocol, above, attention is now directed to FIG. 4 wherein another innovative aspect of the present invention is presented. As shown, FIG. 4 illustrates a circuit diagram of a bandwidth optimized I/O bus 106 of FIG. 1 which employs an innovative control protocol facilitating direct memory access I/O transfers between network device modules, e.g., processor modules 102 and I/O link modules 104. Those skilled in the art will appreciate, from the description to follow, that I/O bus 106 is configured and controlled to facilitate data transfers along one or more dynamically provisioned virtual channels. In one embodiment, for example, optimized I/O bus 106 is dynamically configured and controlled to facilitate data transmission along a single virtual channel at a first time, and as a plurality of channels at a second time. That is, I/O bus 106 and associated protocol provide a dynamically configurable means of supporting high capacity, low latency DMA transfers of data, heretofore unavailable in the networking arts in support of the innovative memory system described above. Although depicted and described in association with communication between processor modules and link modules, those skilled in the art will appreciate that the teachings of the present invention are transferable to any bus environment.

As depicted in FIG. 4, in accordance with one example embodiment of the present invention, processor module 102 is shown coupled to I/O link module 104 via the innovative bandwidth optimized I/O bus 106. Registers 402–412 of processor module 102 are cumulatively referenced as register 120 in FIG. 1, while registers 414–424 are cumulatively referenced as register 122 in FIG. 1. As provided above, such registers are well known by those skilled in the art and, thus, need not be further described here.

In accordance with one embodiment of the present invention, I/O bus 106 utilizes four (4) synchronous DMA control signals DMA REQ_OUT [1:0] 430, and DMA REQ_IN [1:0] 431 to dynamically provision bandwidth and control data transfer between link module 104 and processor module 102 over bandwidth optimized I/O bus 106. As will be described in greater detail below, DMA control signals 430 and 431 are utilized to signal transmit queries and responses between network device modules, e.g., processor module 102 and link module 104, and link modules, and to determine which DMA channels are available and to be used for data transfer. In accordance with one aspect of the present invention, the query/response protocol is designed to occur concurrently with data transfer. That is, while data is being transferred from one network device module to another, the query/response cycle for the next transfer iteration can occur at the same time. Those skilled in the art will appreciate that such overlap enables the next iteration (transmit or receive) to be set up to start immediately after the current iteration has completed, thereby providing optimum data bandwidth over the data channels.

In accordance with one aspect of the present invention, the bandwidth provisioning and data control of I/O bus operate in accordance with a protocol designed around a query/response paradigm. In accordance with the illustrated example embodiment, control of the bus is performed through transmit request queries and associated responses sent via REQ_OUT 430 and REQ_IN 431. In accordance with the query/response paradigm of the present invention, each query is responded to, irregardless of whether the responding module can authorize the requested action. For example, a transmit query for each channel must be affirmatively responded to before transmission along that channel may begin. Thus, in accordance with one embodiment of the present invention, REQ_OUT 430 and REQ_IN 431 alternate between servicing channels in the transmit and receive directions, i.e., through time division multiplexing. A period of time during which all serviceable transmit channels are managed is called the transmit iteration. Similarly, a receive iteration is the period in which all serviceable receive channels are accommodated. In other embodiments, however, a response is only generated when the requested action is authorized. In accordance with one example embodiment of the present invention, a DMA transmit request query cycle is initiated by processor module 102 driving REQ_OUT [1] LOW and REQ_OUT [0] HIGH for one clock cycle. In one embodiment,the next two clock cycles are used to multiplex the transmit status of the four DMA channels, i.e., bandwidth requested, from processor module 102 to link module 104. In one embodiment of the present invention, REQ_OUT [0] is used in successive clock cycles to denote the transmit status of channels 0 and 2, while REQ_OUT [1] is used in successive clock cycles to denote the transmit status of channels 1 and 3. In one embodiment of the present invention, driving the appropriate REQ_OUT line to LOW indicates a valid transmit buffer is available and awaiting data transmission on the channel represented by the time-division slot. For example, the following DMA transmit request query denotes that processor module 102 has data to transmit on all four channels of a four-channel I/O bus 106:

| (Clock 1) | (Clock 2) | (Clock 3) | (Ex. 1) |
|---|---|---|---|
| LH (Transmit) | LL (Ch. 0,1) | LL (Ch. 2,3) | |

As denoted above in Example 1, in the first cycle, REQ_OUT [1] is driven low to indicate a request query, while REQ_OUT [0] indicates the type of request query (high denotes transmit while low denotes receive). In subsequent cycles, the status of each of the channels of the multi channel bus is presented (low denotes available). In one embodiment of the present invention, the requested bandwidth (i.e., the status of each of the channels of the bus) is presented in the subsequent two clock cycles. Thus, the above example denotes a transmit request with data available for transmission on all four channels of a four channel bus.

When link module 104 receives a transmit query request, in accordance with one embodiment of the query/response paradigm, a response cycle on REQ_IN [1:0] 431 is generated. In one embodiment, link module 104 drives REQ_IN [1] low to denote a response cycle, while REQ_IN [0] remains HIGH to denote a transmit response cycle. During subsequent clock cycles, the state of each REQ_IN [1:0] line denotes which channels are available on link module 104 to accept data for transmission. In one embodiment, for example, REQ_IN[1] is associated with channels 0 and 2, while REQ_IN[0] is associated with channels 1 and 3. For example, the following transmit response denotes that link module 104 has bandwidth available to accept data on all four channels of four-channel I/O bus 106:

| (Clock A) | (Clock B) | (Clock C) | (Ex. 2) |
|---|---|---|---|
| LH (Transmit) | LL (Ch. 0,1) | LL (Ch. 2,3) | |

As denoted above, in a first cycle, REQ_IN [1] driven low is indicative of a response, while REQ_IN [0] driven high indicates the type of response (high denotes transmit while low denotes receive). In subsequent cycles, the status of each of the channels of the multi channel bus is presented (low denotes available). Thus, the above example denotes a transmit response wherein link module 104 is available to accept data for transmission on all four channels of a four-channel I/O bus 106.

Although this aspect of the present invention has been described with reference to a particular number of control signals and bus size, those skilled in the art will appreciate that the invention is not so limited. In fact, those skilled in the art will appreciate that the teachings of the present invention may well be practiced with more or less control signals, more or less data channels, and greater or lesser bus sizes without deviating from the spirit and scope of the present invention.

Figure 5:
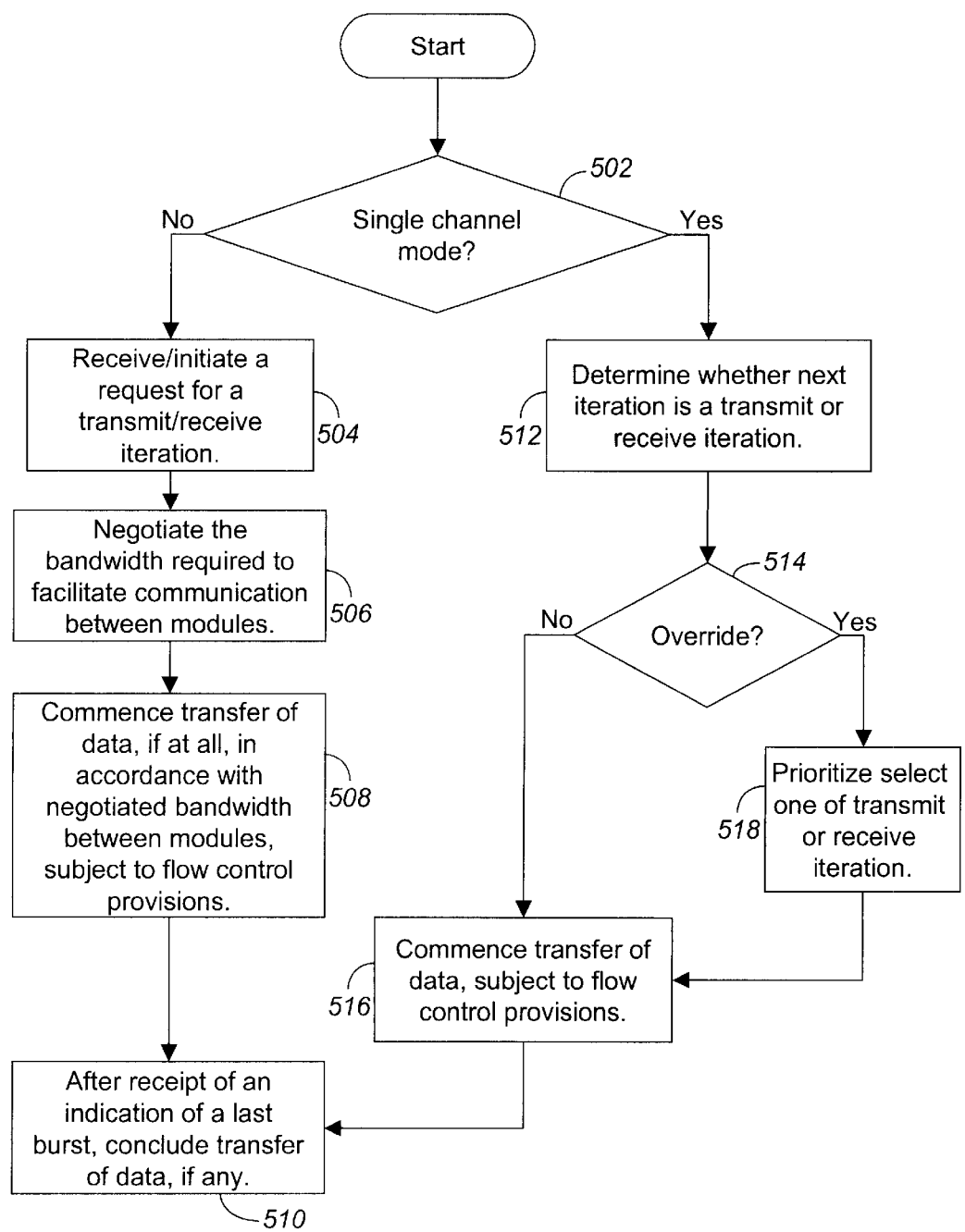
FIG. 5 illustrates a flow chart of an example method for controlling and optimizing the bandwidth of an input/output bus incorporating the teachings of the present invention, in accordance with one embodiment of the present invention.

Having introduced the architectural elements and the control protocol of bandwidth optimized I/O bus 106, above, an example method of operation will be provided with reference to the flow chart of FIG. 5, and the signaling diagrams of FIGS. 6–8. For ease of explanation, and not limitation, the operation of the bandwidth optimized I/O bus 106 and associated control protocol will be described with continued reference to FIGS. 1 and 4.

Turning to FIG. 5, a flow chart depicting an example method for controlling the bandwidth optimized I/O bus of FIGS. 1 and 4 is depicted. As provided above, I/O bus 106 may operate in one of two modes, e.g., single channel mode or a multi-channel mode based, at least in part, on the bandwidth requirements of the communicating modules. Accordingly, the method of FIG. 5 begins, a block 502 with a determination of whether the I/O bus 106 is to operate in single or multi-channel mode. If, in block 502, it is determined that multi-channel mode is preferred or required, I/O bus 106 awaits a request for a receive or transmit iteration from one of the modules (e.g., processor module or link module) in block 504. Upon receipt of such a request, the modules negotiate the bandwidth requirements for the communication, block 506. In accordance with the teachings of the present invention, as described above, the negotiation is carried out between the modules via the query/response protocol of REQ_OUT and REQ_IN. In accordance with one embodiment, the modules identify which channels, if any, are available for the transfer of data. Once the determination has been as to which communication channels are available, the transfer of data may commence on the selected communication channels, subject to the flow control provisions of I/O bus 106 to be described more fully below, block 508. Transfer of data continues, in block 510, until an indication of the last burst (BLAST) is received. To further illustrate the operation of transmit and receive iterations of I/O bus 106, attention is directed to the example signaling diagrams of FIGS. 6A and 6B, respectively.

Having introduced one example of a suitable query/response protocol, above, examples of data transfer in accordance with a transmit iteration and a response iteration in a multi-channel mode of an I/O bus incorporating the teachings of the present invention will be presented with reference to FIGS. 6A and 6B, respectively. Those skilled in the art will appreciate that the signaling depicted in adjacent steps in the following figures is not intended to represent adjacent clock cycles. That is, as with any hardware interface, the speed at which communication between two modules occurs depends on the inherent latencies associated with the physical position and location of the modules. Thus, while signaling in FIGS. 6A and 6B may appear to occur in immediately adjacent steps, those skilled in the art will appreciate that it may well require several clock cycles for the signals to actually propagate between the network device modules.

In accordance with the illustrated example embodiment of FIG. 6A, a transmit request cycle in multi channel mode is depicted, wherein control and status signals corresponding to each of the four DMA channels of I/O bus 106 are controlled on a time division basis. As shown, FIG. 6A illustrates the status of REQ_OUT [1:0] 430 signal line, REQ_IN [1:0] 431 signal line, DMA burst control line 434, DMA blast control line 436, and DMA data bus [31:0] 432 to transmit data to up to multiple DMA channels in a time division manner. As shown, the control signals are inactive (denoted by both control lines of REQ_OUT 430 and REQ_IN 431 being driven to a high state HH) during cycles 602 and 604. In cycle 606, a DMA transmit query signal is issued by processor module 102 over REQ_OUT[1:0] 430 denoting a transmit operation, e.g., REQ_OUT [1] is Low denoting a query, and REQ_OUT [0] is High denoting a transmit query. In subsequent cycles 608 and 610, processor module denotes which channels over which it has data to transfer, in accordance with the protocol described above.

In cycle 608, link module 104 acknowledges receipt of the transmit query with a transmit response, e.g., REQ_IN [1] is low (response), while REQ_IN [0] is high (transmit operation). In cycles 608 and 610, link module 104 receives the bandwidth request (e.g., the channels for which processor module would like to transfer data) from processor module 102 via REQ_OUT [1:0] 430. In one embodiment, link module 104 acknowledges its ability to accept data via at least one of the requested data channels by issuing a transmit response via REQ_IN 431, in accordance with the protocol described above.

In accordance with the teachings of the present invention, transmit bursts will only occur if processor module 102 and link module 104 each drive their corresponding signals (REQ_OUT and REQ_IN, respectively) low in the same query/response iteration. Thus, in accordance with the illustrated example embodiment, any response/query iteration may have 0, 1, 2, 3 or 4 channels serviced, as negotiated between processor module 102 and link module 104 over REQ_OUT 430 and REQ_IN 431.

In cycle 610, once link module 104 has acknowledged the transmit request query of processor module 104, DMA burst control line 434 is driven low enabling data transfer to commence to at least one DMA channel in subsequent cycles 612, to the DMA channel(s) approved by link module 104 in cycles 610 and 612. Thus, in accordance with one embodiment of the present invention, data transmission along DMA_DATA 432 need not wait until link module 104 has responded with the status of all DMA channels before transmission can begin. As shown in FIG. 6A, insofar as link module 104 approved transmission to DMA channel 0 in cycle 610, data transmission may begin in cycle 612, subject to the burst last (BLAST) and flow control (FLCTL) signals to be described more fully below, without the need to determine whether data transmission is approved for DMA channels 1 and 3. In accordance with the illustrated example embodiment of FIG. 6A, link module 104 approves transmission along all DMA channels in clock cycles 610 and 612, and transmission of data to channels 0, 2, 1 and 3 occur during clock cycles 612 through 618, as shown. Although transmit data is shown one cycle after DMA.PORT, it may well occur in the same clock cycle in alternate embodiments. Further, those skilled in the art will appreciate that actual transmission of data may well extend over multiple clock cycles.

Having described the general operation of I/O bus 106 and its associated protocol in accordance with the DMA transmit example of FIG. 6A, a DMA receive iteration will be briefly explained with reference to FIG. 6B. In accordance with the illustrated example embodiment, processor module 102 denotes its ability to receive data from link module 104 by asserting both lines of REQ_OUT [1:0] low (denoting both a request query [1] and a receive iteration [0]). In subsequent clock cycles 608 and 610, respectively, processor module 102 denotes which channels are available to receive data transfer. As shown in FIG. 6B, by driving REQ_OUT [1:0] low for two subsequent cycles indicates that processor module 102 can receive data via all four channels.

In response to the receive request query of processor module 102 via REQ_OUT[1:0], link module 104 responds in cycle 608 by driving REQ_IN [1:0] low, e.g., to denote a response [1] of a receive request [0]. As with the transmit iteration, link module 104 denotes which channels are available for data transfer in subsequent clock cycles 610 and 612 for channels 0, 2 and 1, 3 respectively. Once the response is received, the DMA_BURST line is driven low in cycle 610, providing for data transfer in subsequent cycles until indication of the last burst (BLAST) is received. As shown, data transfer occurs during cycles 612–618, wherein indication of the last burst was received in cycle 616 denoting the end of the transfer.

Having described the dynamic bandwidth provisioning and control features of innovative I/O bus 106 while operating in the multi-channel mode, above, with reference to FIGS. 5, 6A and 6B, a brief explanation of control and operation while in single channel mode will be described with continued reference to FIG. 5 and reference to FIG. 7.

Those skilled in the art will appreciate that when I/O bus 106 is configured to support only one bidirectional channel, there is no need to time division multiplex the REQ_IN/OUT 431/430. On the contrary, in single channel mode, each signal becomes a dedicated status line reflecting the complete state of channel 0. Since there is no query/response protocol required in single-channel mode, the network device modules must independently come to the same conclusion as to which direction of data transfer iteration is to occur next. In one embodiment, for example, the network device modules alternate between transmit and receive iterations. Thus, with reference to FIG. 5, a determination is made in block 512 as to whether the next iteration is to be a receive or transmit iteration. In one embodiment, channels 1, 2 and 3 cannot be used in single channel mode and are held in reset by software executing on the network device, e.g., the operating system of the network device.

In alternate embodiments, several optimizations are possible such as, for example, prioritizing one of the iteration directions (e.g., the receive iteration direction), or one of the modules can locally latch the condition of the other relative to its ability to send or receive data. Thus, in block 514 a decision is made whether to override the iteration identified in block 512. If in block 514 it is decided not to override the natural selection of the next iteration, data transfer commences in block 516, subject to the flow control provisions of I/O bus 106 to be described more fully below.

In one embodiment of the present invention driving REQ_OUT [1] low denotes processor module 102 is ready to receive data, while driving REQ_OUT [0] low denotes that processor module 102 is transmit ready. Similarly, driving REQ_IN [1] low denotes a receive request by link module 104, while driving REQ_IN [0] low denotes a transmit request by link module 104. An example timing diagram of the single channel mode of operation is provided with reference to FIG. 7.

Turning to FIG. 7 a diagram depicting control of I/O bus 106 operating in single channel mode is depicted, in accordance with one embodiment of the present invention. As shown, link module 104 initiates data transfer by driving REQ_IN [0] 431 low in cycles 704 through 710. In response, processor module 102 acknowledges that it is transmit ready by driving REQ_OUT [0] 430 low in cycles 706 through 712. In cycle 710, the DMA_BURST line is driven low indicating that transmission of the data can commence in cycles 712.

The transfer of data commenced in block 516 will continue until, in block 510 an indication is received denoting the last authorized data burst. That is, data transfer ceases in cycle 718 after BLAST 436 is driven low in cycle 716 denoting the last authorized data burst. As shown, the data is transmitted between network modules via DMA channel 0 432 during cycles 712 through 718.

If, in block 514, an override is authorized, a select one of the transmit or receive iterations is prioritized as the next iteration, block 518. Data transfer commences as the process continues with block 516, as shown.

As alluded to above, in accordance with one aspect of the present invention, I/O bus 106 includes a flow control feature designed to interrupt processor module receive iterations. In accordance with the teachings of the present invention, assertion of FLCTL 437 during a processor module receive iteration is intended to allow temporary insertion of wait states into the receive iteration. When FLCTL 437 is asserted, the link module may complete the current burst in progress and may start another burst if it is recognized simultaneously with the assertion of FLCTL, but it may not start another burst. In one embodiment, assertion of the flow control mechanism does not terminate the receive iteration, which resumes as soon as the condition necessitating the flow control clears. In accordance with the teachings of the present invention, flow control allows short asynchronous events to occur without breaking the overall flow of data between the transmit and receive iterations. Examples of such asynchronous events may include, but are not limited to, reaching a maximum threshold of outstanding coherency operations (as described above in association with the innovative memory system of the present invention); a high priority but infrequently occurring memory access which otherwise is not figured into the overall system bandwidth, such as a memory refresh, occurs; a high priority but infrequently occurring system event, such as a software access to a key resource, which is not otherwise figured into the overall system bandwidth, occurs. An example signaling diagram illustrating assertion of the flow control mechanism is provided with reference to FIG. 8.

Turning to FIG. 8, a signaling diagram depicting the operation of the flow control mechanism of the present invention is presented. As shown, the processor module establishes the receive iteration in cycles 806 through 810, indicating that it can accept data via all four channels. In cycles 808 through 812, the link module acknowledges the receive request and its ability to supply data for all four channels. In cycle 810, however, the processor module asserts the flow control mechanism by driving DMA_ FLCTL 437 low, denoting that the receive iteration must be interrupted. More specifically, the flow control mechanism is asserted concurrently with the link module sending data on channel 0 (as reflect by DMA_BURST) indicating that the burst on channel 0 and another burst are allowed. Thus, transfer of data via channels 0 and 2 will occur uninterrupted in cycle 812 and 814, as shown. Link module is prohibited, however, from transferring any further data until the flow control condition has been removed. In accordance with the illustrated example diagram of FIG. 8, the flow control mechanism is only asserted for one cycle and, thus, transfer of data via channels 1 and 3 resumes in cycles 818 and 820 after a one cycle interruption in cycle 816. It should be noted that, although data transmission has been interrupted during assertion of the flow control mechanism, the control of the I/O bus via REQ_OUT and REQ_IN may well continue, thereby continuing to optimize the available bandwidth of the I/O bus. Accordingly, the flow control mechanism of the present invention is selectively invoked, as necessary, to enable an asserting module to stall the data transfer for any of a number of reasons, while control of the bus continues unabated.

Figure 9:
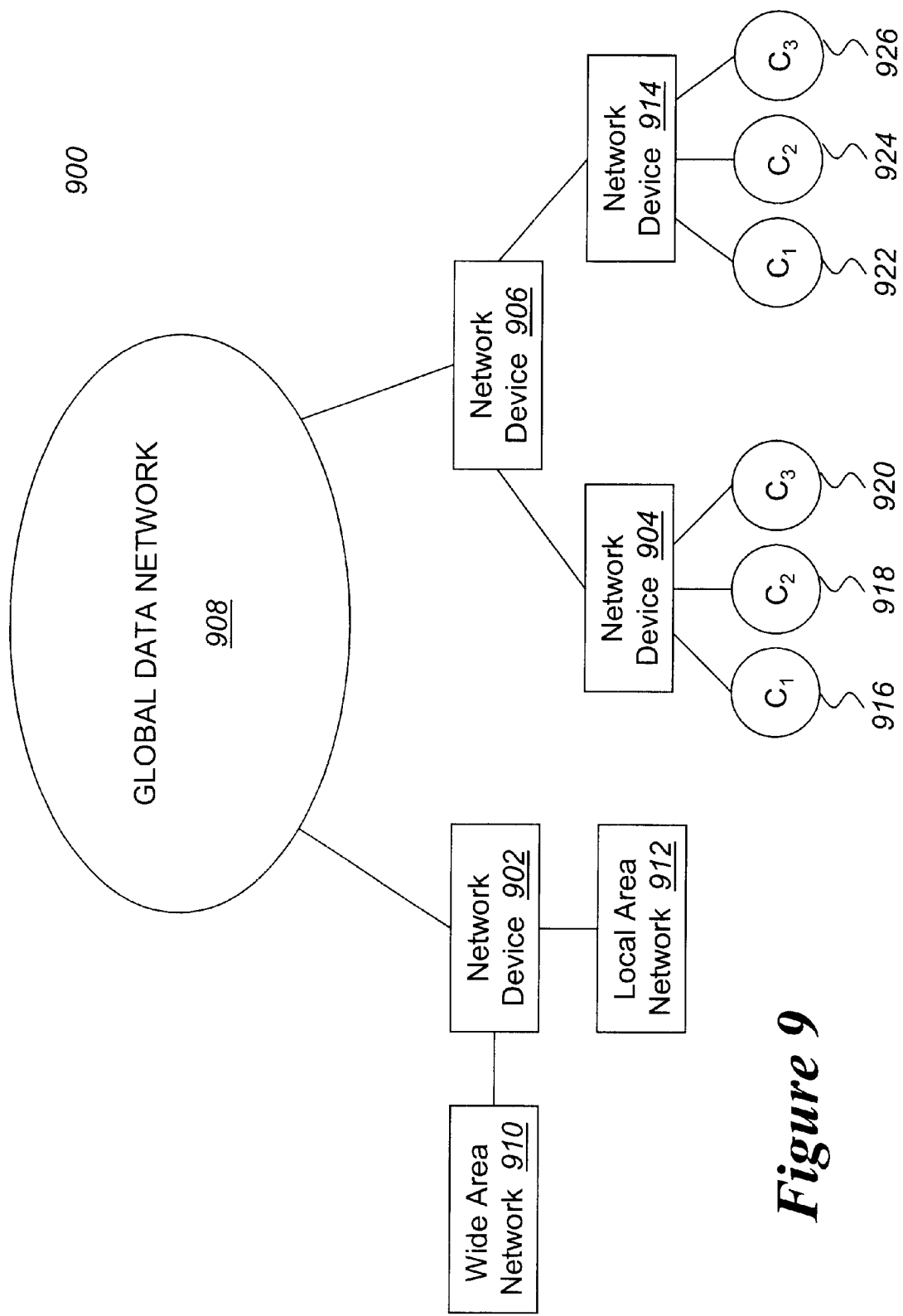
FIG. 9 illustrates a block diagram of an example data network within which the teachings of the present invention may be practiced.

Having described the innovative aspects of the teachings of the present invention with reference to FIGS. 1 through 8, above, reference is now made to FIG. 9 wherein an example data network incorporating the teachings of the present invention is provided. Turning to FIG. 9, a block diagram of an example data network incorporating the teachings of the present invention is presented, in accordance with one embodiment of the present invention. In accordance with the illustrated example embodiment of FIG. 9, data network 900 is shown comprising number of network devices 902, 904 and 906 communicatively coupling a number of separate data networks 908, 910 and 912 and client stations 916 through 926, as denoted. In one embodiment, one or more of network devices 902, 904 and/or 906 are incorporated with the teachings of the present invention, providing bandwidth optimized I/O between modules of the network device and an improved caching mechanism and system coherency protocol.

In accordance with the illustrated example data network of FIG. 9, network device(s) 902, 904, 906 are intended to represent any of a number of core network devices known to those skilled in the art which provide differentiated service levels of communication. In one embodiment, for example, core devices 902 incorporating the teachings of the present invention is a router. In one embodiment, for example, network device 902 of the present invention is a router, while in an alternate embodiment, network device 902 incorporating the teachings of the present invention is a switch or a bridge. In an alternate embodiment, network device 902 is a server supporting network switching and communications.

Similarly, the communication links illustrated in FIG. 9 communicatively coupling the elements of data network 900 may be any of a wide range of conventional wireline and wireless communication media, and may be different for different clients, servers, bandwidth brokers and other network devices. For example, a communication link may be a cable, a fiber optic cable, or may represent a nonphysical medium transmitting electromagnetic signals in the electromagnetic spectrum. Additionally, a wireless communication link may also include any number of conventional routing or repeating devices, such as satellites or electromagnetic signal repeaters or basestations. Irregardless of the form of communication medium, data is typically transferred between network elements using any of a number of data communication protocols. In accordance with such data communication protocols, data is generally transferred between network elements in units commonly referred to as packets, frames, datagrams and the like. Typically, each packet includes data, a source address and a target address. As will be described in greater detail below, additional control information, generally included in a header, may also be included in the packet. The number of bytes of data contained within a packet is dependent upon the communication resources of the client, the host and the network protocol employed.

In addition to the embodiments described above, those skilled in the art will appreciate that the teachings of the present invention may well be integrated within a single integrated circuit (not shown). That is, those skilled in the art will appreciate that advances in IC fabrication technology now enable complex systems to be integrated onto a single IC. Thus, in accordance with one embodiment of the present invention, the teachings of the present invention may be practiced within an application specific integrated circuits (ASIC), programmable logic devices (PLD), microcontroller, processor and the like.

While the many innovative features and aspects to the present invention have been described in terms of the above illustrated embodiments, those skilled in the art will recognize that the invention is not limited to the embodiments described. The present invention can be practiced with modification and alteration within the spirit and scope of the appended claims. In particular, the present invention may be practiced with other features and/or feature settings. Particular examples of other features include but are not limited to transaction communication protocols and architectural attributes. Accordingly, the description is to be regarded as illustrative instead of restrictive on the present invention.

Thus, alternate methods and apparatus for increasing frame transmission rates while maintaining system coherency have been described.

What is claimed is:

1. An apparatus comprising a cache memory having a plurality of cache lines storing a frame of data, wherein a resident processor performs software coherency control by:
   accessing a first subset of said frame of data for processing; and
   issuing a first invalidation instruction for cache lines storing said accessed subset of said frame of data;
   and wherein a memory controller performs hardware coherency control by issuing a second invalidation instruction for cache lines storing a second subset of said frame of data in response to new data being written into said second cache lines, wherein said first subset is different than said second subset.

2. The apparatus of claim 1, wherein software coherency control maintains the system coherency for cache lines accessed by said resident processor.

3. The apparatus of claim 1, wherein software coherency control is comprised of a plurality of executable instructions executing on the resident processor to selectively invoke an invalidate operation.

4. The apparatus of claim 3, wherein the software coherency control issues the invalidate operation to invalidate the content of a processor accessed memory element as the processor accesses the memory element.

5. The apparatus of claim 1, wherein hardware coherency control maintains the system coherency for memory elements written by direct memory access (DMA) devices.

6. The apparatus of claim 1, wherein hardware coherency control maintains system coherency by issuing a kill operation when an appropriate memory element is written by a direct memory access (DMA) device.

7. The apparatus of claim 1, wherein software coherency control is performed by a plurality of processors, while hardware coherency control is maintained by a plurality of memory controllers.

8. The apparatus of claim 1 further comprising a tag buffer comprising a plurality of memory elements corresponding to the plurality of memory elements of the system and cache memories.

9. The apparatus of claim 8, wherein each of the memory elements of the tag buffer stores state information associated with corresponding memory elements of the system memory or the cache memory.

10. The apparatus of claim 9, wherein the state information denotes whether the corresponding memory element in system memory or cache memory is under hardware or software coherency control.

11. A method for maintaining system coherency of a plurality of cache lines storing a frame of data comprising:

maintaining the system coherency of a select subset of the plurality of cache lines by an accessing processor through software coherency control, wherein the access processor performs the system coherency by:
accessing a first portion of said frame of data stored in said select subset of cache lines for processing; and
issuing a first invalidation instruction for said accessed subset of cache lines; and
maintaining the coherency of the remaining plurality of memory elements through hardware coherency control, wherein a memory controller performs the system coherency by issuing a second invalidation instruction for a non-select subset of cache lines storing the remaining data of said frame of data in response to new data being written into said non-select subset of cache lines.

12. The method of claim 1, wherein software coherency control is performed by said accessing processor.

13. The method of claim 12, wherein the processor issues an invalidate operation upon accessing a memory element.

14. The method of claim 11, wherein the memory controller issues a kill operation when a memory element is written to by a direct memory access (DMA) device.

15. The method of claim 11, further comprising:
utilizing a tag buffer having a plurality of memory elements corresponding to the system and cache memory elements to maintain state information associated with each of the plurality of memory elements of the system and cache memories.

16. The method of claim 15, wherein the state information denotes whether the associated memory element is subject to hardware or software coherency control.

17. A computer readable storage medium having stored therein a plurality of executable instructions which, when executed, implement a system coherency function in which the system coherency of a select subset of a plurality of cache lines storing a data frame are maintained by a processor through software coherency control by:
accessing said select subset of cache lines for processing the data stored therein; and
issuing a first invalidation instruction for said accessed subset of cache lines;
while the system coherency of the remaining plurality of memory elements are maintained by a memory controller through hardware coherency control by issuing a second invalidation instruction for said remaining cache lines of said frame of data in response to new data being written into said remaining cache lines of said frame of data.

* * * * *